US011583908B2

(12) United States Patent
Auzinger et al.

(10) Patent No.: US 11,583,908 B2
(45) Date of Patent: Feb. 21, 2023

(54) BENDING BEAM FOR A SWIVEL BENDING MACHINE

(71) Applicant: TRUMPF Maschinen Austria GmbH & Co. KG., Pasching (AT)

(72) Inventors: Michael Auzinger, Linz (AT); Stefano Speziali, Foligno (IT)

(73) Assignee: TRUMPF Maschinen Austria GmbH & Co. KG, Pasching (AT)

(*) Notice: Subject to any disclaimer, the term of this patent is extended or adjusted under 35 U.S.C. 154(b) by 144 days.

(21) Appl. No.: 16/094,242

(22) PCT Filed: Apr. 18, 2017

(86) PCT No.: PCT/AT2017/060096
§ 371 (c)(1),
(2) Date: Oct. 17, 2018

(87) PCT Pub. No.: WO2017/181208
PCT Pub. Date: Oct. 26, 2017

(65) Prior Publication Data
US 2019/0126335 A1    May 2, 2019

(30) Foreign Application Priority Data
Apr. 18, 2016    (AT) .............................. A 50347/2016

(51) Int. Cl.
B21D 5/00    (2006.01)
B21D 5/04    (2006.01)
(Continued)

(52) U.S. Cl.
CPC ............... *B21D 5/006* (2013.01); *B21D 5/04* (2013.01); *G01B 11/26* (2013.01); *G01B 21/22* (2013.01); *G01B 2210/44* (2013.01)

(58) Field of Classification Search
CPC . B21D 5/006; B21D 5/04; B21D 5/00; B21D 5/042; B21D 5/045; B21D 11/22;
(Continued)

(56) References Cited

U.S. PATENT DOCUMENTS

| 4,564,765 A * | 1/1986 | Blaich | B21D 5/02 |
| | | | 250/559.37 |
| 5,704,238 A * | 1/1998 | Tokai | B21D 5/02 |
| | | | 72/31.11 |

(Continued)

FOREIGN PATENT DOCUMENTS

| CN | 1259889 A | 7/2000 |
| DE | 199 30 745 A1 | 1/2000 |

(Continued)

OTHER PUBLICATIONS

Machine translation of WO 2013/116888 (Year: 2013).*
International Search Report of PCT/AT2017/060096, dated Apr. 23, 2017.

*Primary Examiner* — Shelley M Self
*Assistant Examiner* — Teresa A Guthrie
(74) *Attorney, Agent, or Firm* — Collard & Roe, P.C.

(57) ABSTRACT

An elongated bending beam for a swivel bending machine has an approximately C-shaped beam cross section and two bending tools, which are opposite one another relative to a preferably horizontal central plane, and which run facing one another in the longitudinal direction of the bending beam, between which a workpiece portion of a workpiece to be bent can be introduced. An angle-measuring system for contactlessly measuring a bending angle is arranged inside the C-shape beam cross section, with which a bending angle can be measured relative to a reference plane at a workpiece section bent by one of the bending tools. The angle-measuring system also includes a first angle-measuring unit arranged below the central plane and having a first measur- (Continued)

ing region positioned substantially above the central plane, and a second angle-measuring unit arranged above the central plane and having a second measuring region positioned substantially below the central plane.

13 Claims, 5 Drawing Sheets

(51) Int. Cl.
  *G01B 11/26* (2006.01)
  *G01B 21/22* (2006.01)
(58) Field of Classification Search
  CPC .......... B21D 7/14; B21D 33/00; G01B 11/26; G01B 21/22; G01B 2210/44; G01B 5/24; G01B 9/10; B21C 51/00; G01C 1/00
  USPC ............ 72/19.6, 18.1, 18.2, 16.1, 16.2, 16.4
  See application file for complete search history.

(56) References Cited

U.S. PATENT DOCUMENTS

| | | | |
|---|---|---|---|
| 6,098,435 A * | 8/2000 | Takada | B21D 5/02 |
| | | | 72/31.11 |
| 6,266,984 B1 | 7/2001 | Gasparini | |
| 6,292,716 B1 * | 9/2001 | Moore, Jr. | B23Q 15/225 |
| | | | 700/260 |
| 6,473,537 B1 | 10/2002 | Yamada | |
| 6,727,986 B1 | 4/2004 | Serruys | |
| 2007/0266752 A1 * | 11/2007 | Patuzzi | B21D 5/006 |
| | | | 72/16.1 |
| 2016/0151820 A1 * | 6/2016 | Woidasky | B21D 5/0272 |
| | | | 72/20.2 |
| 2017/0203349 A1 | 7/2017 | Angerer et al. | |

FOREIGN PATENT DOCUMENTS

| | | | | |
|---|---|---|---|---|
| DE | 100 09 074 A1 | 9/2001 | | |
| DE | 20 2010 006 391 U1 | 11/2010 | | |
| EP | 1 102 032 A1 | 5/2001 | | |
| EP | 2 147 729 A1 | 1/2010 | | |
| EP | 2 660 599 A1 | 11/2013 | | |
| EP | 2 982 933 A1 | 2/2016 | | |
| JP | H02-62905 A | 3/1990 | | |
| JP | H02-142619 A | 5/1990 | | |
| JP | H07-275952 A1 | 10/1995 | | |
| JP | H07-299521 A | 11/1995 | | |
| JP | H08-141650 A | 6/1996 | | |
| JP | H11-216520 A | 8/1999 | | |
| JP | 2000-051950 A | 2/2000 | | |
| WO | 2004/108318 A1 | 12/2004 | | |
| WO | 2010/053428 A1 | 5/2010 | | |
| WO | 2013/059851 A2 | 5/2013 | | |
| WO | WO-2013059851 A2 * | 5/2013 | ............ | B21D 5/006 |
| WO | WO-2013116888 A1 * | 8/2013 | .......... | B30B 15/044 |
| WO | 2016/011472 A1 | 1/2016 | | |

* cited by examiner

BENDING BEAM FOR A SWIVEL BENDING MACHINE

CROSS REFERENCE TO RELATED APPLICATIONS

This application is the National Stage of PCT/AT2017/060096 filed on Apr. 18, 2017, which claims priority under 35 U.S.C. § 119 of Austrian Application No. A50347/2016 filed on Apr. 18, 2016, the disclosure of which is incorporated by reference. The international application under PCT article 21(2) was not published in English.

BACKGROUND OF THE INVENTION

1. Field of the Invention

The invention relates to a bending beam for a swivel bending machine as well as to a method for measuring a bending angle on a workpiece in a swivel bending machine.

The subject matter of the invention will be referred to in the following as bending beam, wherein subject matters referred to as edge rockers or bending jaws are also included alternatively.

2. Description of the Related Art

In order to fulfill the constantly more stringent requirements imposed on the accuracy of the bending angle achieved for workpieces being bent in swivel bending machines, constructions already exist that have angle-measuring systems capable of quantitatively sensing the forming behavior of workpieces, especially the springback, and calculating it for subsequent bending processes. For example, a swivel bending machine is known from JP H 07275952 A1 in which an angle-measuring system working on the tactile principle is integrated in the bending beam.

Furthermore, a swivel bending machine having a contactlessly operating angle-measuring system, which is integrated in a bending beam having a C-shaped beam cross section, is known from WO 2004/108318 A1.

However, the existing solutions are limited to simple workpiece geometries, and the applicability to increasing the bending accuracy in general is extremely limited.

SUMMARY OF THE INVENTION

The task of the present invention was to overcome the disadvantages of the prior art and to provide an apparatus and a method by means of which a user is able to perform accurate bending-angle measurements on swivel bending machines in the most diverse application situations.

This task is accomplished by an apparatus and a method according to the claims.

The apparatus according to the invention consists in a bending beam for a swivel bending machine, wherein the elongated bending beam has an approximately C-shaped beam cross section and two bending tools, which are disposed oppositely relative to a preferably horizontal central plane, which are turned toward one another and which extend in longitudinal direction of the bending beam, and between which a workpiece portion of a workpiece to be bent can be introduced. Within the interior of the bending beam enclosed by this C-shaped beam cross section, an angle-measuring system for contactless measurement of a bending angle is disposed, with which a bending angle can be measured relative to a reference plane on a workpiece portion being bent by one of the bending tools. For this purpose, it is characteristic that the angle-measuring system comprises a first angle-measuring unit, which is disposed underneath the central plane and has a first measuring region, which is situated for the most part above the central plane, and comprises a second angle-measuring unit, which is disposed above the central plane and has a second measuring region, which is situated for the most part underneath the central plane.

By this subdivision of the possible measuring region of the angle-measuring system into at least two measuring regions, the applicability of the bending-angle measurement can be expanded to the most diverse workpiece geometries and, based on this, an improved accuracy of the produced bending angle can be achieved. Thereby the free space within the bending beam can be used better, or a greater flexibility of positioning of the workpiece portion to be measured exists relative to the angle-measuring units.

In order to simplify the positioning of the bending beam with the angle-measuring units relative to the workpiece portion to be gauged or to minimize the positioning distances necessary for this, it is of advantage when both the first measuring region and the second measuring region include the central plane between the bending tools. Thereby a continuous total measuring region is formed, wherein an overlapping of the measuring regions exists in the region of the central plane and, depending on the existing workpiece geometry, the angle-measuring unit that is more suitable for a bending-angle measurement may be used.

Reliable angle measurements with simultaneously a relatively large, detectable measuring region are possible when the angle-measuring units respectively comprise a light-section sensor with a line laser and an image-sensing unit spaced apart from it. The use of light-section sensors has already proved itself in bending machines, especially by a smaller positioning effort than is the case for tactile systems.

A particularly large free space for bent workpieces, on which a bending angle is to be measured, is achieved when the inside width between the angle-measuring units corresponds to at least 75% of a tool spacing that exists between the bending tools.

It is further advantageous for the practical application when the angle-measuring system is positionable by means of a guide arrangement in longitudinal direction of the bending beam, in particular is positionable beyond one end of the bending tools. Thereby the possibility exists for long workpieces of performing several measurements at different positions along the workpiece, whereby an optimum definition of the subsequent bending process is possible in order to achieve an exact bending angle. Furthermore, the free space for bending may be further enlarged by the extending of the angle-measuring system laterally, wherein workpieces that protrude into this additional free space can no longer be gauged.

A common drive and a common energy and data line for two measuring units are possible when the angle-measuring units are fixed on a common carriage. Thereby the structural complexity can be kept slight.

In order to ensure a more stable guidance of the carriage with higher measuring accuracy, this may be guided on two guide rails spaced apart from one another on a base of the C-shaped beam cross section spaced apart from the bending tools.

An advantageous embodiment may consist in forming a stop face oriented at right angles to the central plane on the carriage at the height of the lower bending tool. This may be used as a reference stop for a workpiece, whereby the possibility exists, for example, of correction of gripping errors of a workpiece manipulator.

One possibility of further increasing the bending-angle accuracy based on the measured bending angles consists in providing, on the bending beam, a cambering device for influencing the curvature along the longitudinal direction of a bending tool. A possible deformation of the workpiece-holding jig as well as of the bending beam itself may be corrected at least partly thereby, as is already applied for press brakes.

The invention also relates to a swivel bending machine known from the prior art, comprising a machine frame, a workpiece-holding unit with a first clamping tool joined to the machine frame, and with a positionable second clamping tool interacting therewith for fixation of a workpiece in a working plane, which in particular is horizontal, in such a way that a workpiece portion to be bent protrudes relative to the workpiece holding unit, and a bending beam mounted positionably on the machine frame and joined to a positioning drive for bending the workpiece portion, for which the bending beam is formed according to the invention.

The invention further relates to a method for measuring a bending angle on a workpiece in a swivel bending machine with an elongated bending beam, wherein this has an approximately C-shaped beam cross section and two bending tools, which are disposed oppositely relative to a preferably horizontal central plane, which are turned toward one another and which extend in longitudinal direction of the bending beam, and between which a workpiece portion of a workpiece to be bent is introduced, and the bending angle is measured relative to a reference plane on a workpiece portion to be gauged by means of an angle-measuring system disposed in the interior of the bending beam. In this connection it is characteristic that, especially after automatic definition by a programmable control device of the angle-measuring system, the bending angle is measured on a workpiece portion to be gauged by means of a first angle-measuring unit disposed underneath the central plane or by means of a second angle-measuring unit disposed above the central plane or by means of first angle-measuring unit and second angle-measuring unit. The advantageous effects achievable in this way have already been explained for the bending beam according to the invention.

For further increase of the angle-measuring accuracy, the method may be additionally supplemented to the effect that the measurement of the bending angle takes place after removal of the bending tool from the workpiece and subsequent deactivation or reduction of the workpiece clamping by the workpiece-holding device. Thereby the workpiece is substantially free of forming forces and clamping forces during the angle measurement, and the state of a complete springback may be assumed.

The size of the measuring regions of the angle-measuring units ensures that the measurement of the bending angle takes place optionally on a workpiece portion that was obtained by two or more preceding bending processes on the workpiece. The angle measurement is therefore not limited to a workpiece portion that was bent immediately beforehand, but instead the evaluation of the angle measurement may be directed specially to a workpiece portion for which the most stringent accuracy requirements exist. For a radius bend composed of a large number of successively performed partial bending steps, the measurement of the bending angle may take place on the straight section at the workpiece beginning.

For larger workpieces with long bending edges, it is advantageous when the bending angle on the workpiece portion after a bending process is measured at several positions spaced apart from one another in longitudinal direction of the bending beam. Thereby any existing fluctuations of the bending angle in longitudinal direction of the bending beam can be sensed and if necessary corrected.

Very accurate bending angles for which possible deformations of the swivel bending machine may be considered are possible when, based on the measurements after a preceding bending process, a subsequent bending process is adapted, and in particular a curvature along the longitudinal direction of a bending tool is actively influenced before or during the subsequent bending process, e.g. by means of a cambering device.

BRIEF DESCRIPTION OF THE DRAWINGS

For better understanding of the invention, it will be explained in more detail on the basis of the following figures.

Therein, respectively in greatly simplified schematic diagrams.

DETAILED DESCRIPTION OF THE PREFERRED EMBODIMENTS

By way of introduction, it is pointed out that like parts in the differently described embodiments are denoted with like reference symbols or like structural part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
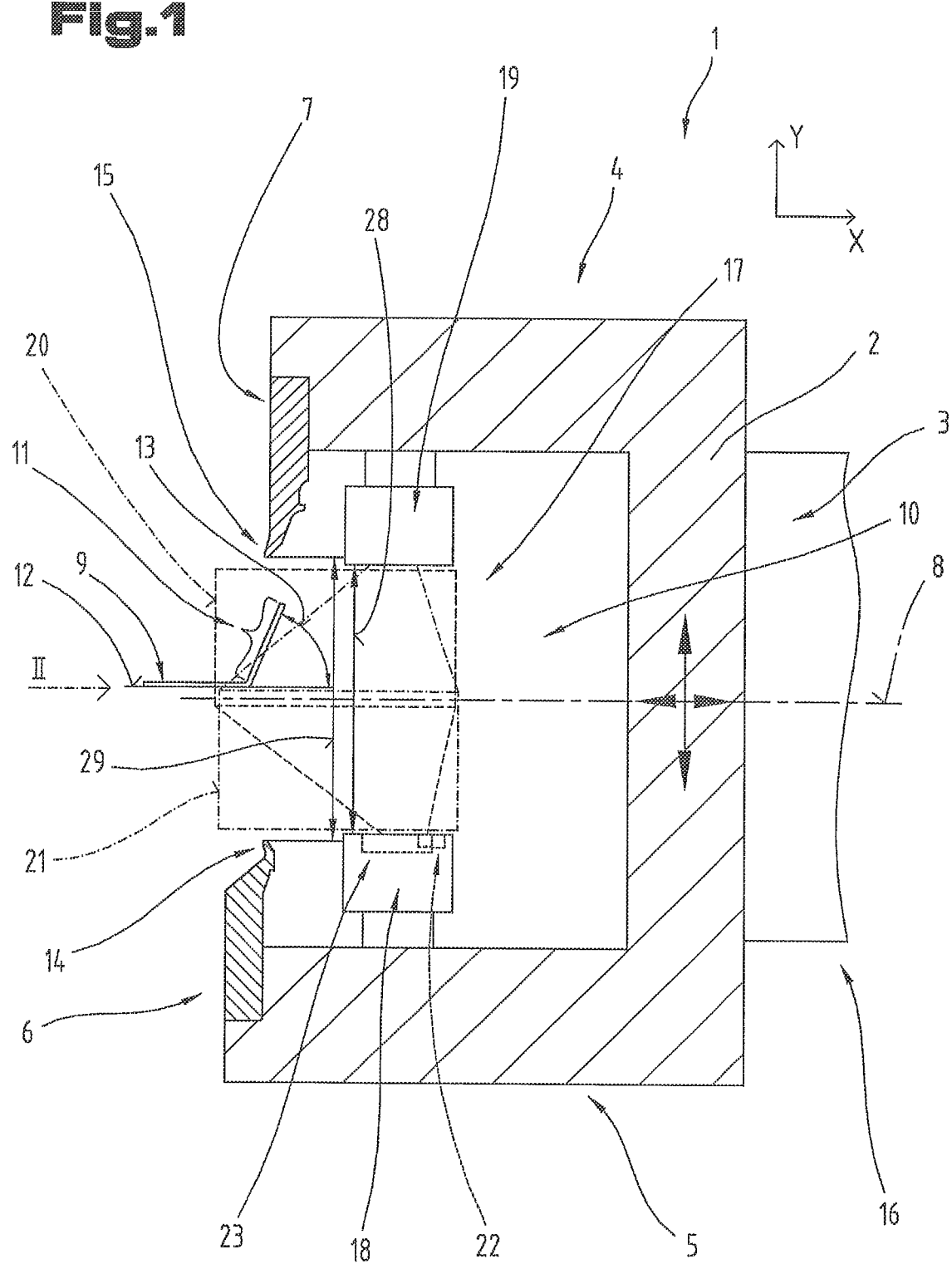
FIG. 1 shows a section through a bending beam of a swivel bending machine with a contactless bending-angle-measuring system.

FIG. 1 shows a section through a bending beam 1 of a swivel bending machine, not illustrated in more detail, as is known from the prior art. The bending beam 1 extends longitudinally at right angles to the drawing plane and in this case possesses an approximately C-shaped beam cross section 2, which is composed substantially of a base 3 oriented in approximately vertical direction and two other ends of limbs 4 and 5 connected in horizontal direction. A lower first bending tool 6 and an upper second bending tool 7 are fastened at the free ends of the two limbs 4 and 5, wherein these are disposed opposite one another relative to a central plane 8 of the bending beam 1 and are turned toward one another. The bending tools 6, 7 may have an identical cross section or else, as also illustrated in FIG. 1, a different cross section. For performance of a bending process, a workpiece 9 may be introduced into the interior 10 of the bending beam 1 enclosed by the C-shaped beam cross section 2, and a part of the workpiece 9 remaining outside the C-shaped beam cross section is fixed by means of a workpiece holding device (see FIG. 3).

A workpiece portion 11 to be bent that is protruding from the workpiece-holding device is bent either upward by means of the first bending tool 6 or downward by means of the second bending tool 7, whereby a certain bending angle 13 relative to a reference plane 12 is produced on the workpiece 9. If a workpiece portion 11 is bent upward by means of a first working edge 14 formed on the first bending tool 6, this is also referred to as a positive bending, whereas a bending downward by means of a second working edge 15 on the second bending tool 7 is referred to as a negative bending.

The movements of the bending beam 1, relative to a fixed machine frame of the swivel bending machine, necessary for execution of bending processes, are brought about by means of a positioning drive 16, wherein positioning movements in both vertical Y direction and in horizontal X direction can be executed, as can also combined movements.

The positioning movements are advantageously controlled by means of a programmed control device of the swivel bending machine, whereby a high repeat accuracy of the bending processes can be achieved. However, since the achievable bending angle 13 on a bent workpiece portion 11 depends not only on the executed positioning movement of the bending beam 1 but also on workpiece properties, such as, for example, workpiece thickness and workpiece strength, the bending angle 13 achievable by a bending process is always subject to certain fluctuations. In the case of high accuracy requirements applicable to the achieved bending angle, it is therefore prior art to apply a two-stage bending method, which is composed of pre-bending and post-bending or finish-bending. During this pre-bending, the workpiece portion 11 is bent to a pre-bending angle that is smaller than the desired final bending angle and, after execution of the pre-bending, the forming behavior of the workpiece 9 is assessed and, during finish-bending the bending portion is bent to the final bending angle while taking the forming behavior into consideration.

The most important factor for the bending accuracy is then the individual springback of the workpiece portion 11 during load relaxation after the bending process. For example, if a springback to a bending angle of 77° is found in the unloaded workpiece 9 during a pre-bending to an angle of 80°, this springback of 3° is considered in a subsequent post-bending process or finish-bending process by applying an angle of 93° during the post-bending to a desired final bending angle of 90° in the unloaded state, in order to compensate for the expected springback of 3°.

In order to be able to apply such a two-stage bending method, the bending beam 1 is provided in the interior 10 with an angle-measuring system 17. In the bending beam 1 according to the invention, the contactlessly operating angle-measuring system 17 comprises a first angle-measuring unit 18, which is disposed underneath the central plane 8 and is oriented upward, and furthermore a second angle-measuring unit 19, which is disposed above the central plane 8 and is oriented downward. The first measuring region 20, which can be sensed by the first angle-measuring unit 18, is illustrated with dashed lines in FIG. 1 and is situated for the most part above the central plane 8. The second measuring region 21, which can be sensed by the second angle-measuring unit 19, is illustrated with dash-dot lines in FIG. 1 and is situated for the most part underneath the central plane 8.

In this arrangement of the angle-measuring units 18, 19, workpiece portions 11 bent upwardly during positive bendings are measured mainly by the upwardly oriented first angle-measuring unit 18, which is disposed underneath the central plane 8, and workpiece portions 11 bent downwardly during negative bendings are measured mainly with the downwardly oriented second angle-measuring unit 19, which is disposed above the central plane 8.

The entire measuring region that can be sensed by this angle-measuring system 17 is composed of the first measuring region 20 and the second measuring region 21 and thereby a comparatively large fraction of the interior 10 of the bending beam 1 can be instrumentally sensed on the whole.

In this connection, it is of advantage when the first measuring region 20 and the second measuring region 21 overlap in the region of the central plane 8 between the bending tools 6 and 7, i.e. both measuring regions 20, 21 also include the central plane 8 between the bending tools 6, 7. Due to the arrangement according to the invention of the angle-measuring units 18, 19, a great flexibility exists with respect to the position of a workpiece portion 11 to be gauged, whereby an exact measurement of bending angles 13 can be achieved even for complicated workpiece geometries with several bending edges.

The angle-measuring units 18, 19 may be advantageously designed respectively as a light-section sensor, which comprises a line laser 22 or another light source that is able to emit a plane light beam, and furthermore an image-sensing unit 23 spaced apart therefrom, e.g. a camera with suitable optics and an image sensor with sufficient resolution. Alternatively thereto, however, other contactlessly operating angle-measuring systems may also be used, such as a laser scanner or time-of-flight camera, for example.

During the use of a light-section sensor, the line laser 22 emits laser light, preferably in a plane that is disposed at right angles to the bending edges to be produced, whereby clearly visible laser-light segments are produced on the workpiece 11 to be gauged. The image-sensing unit 23, which is spaced apart from the line laser 22, views these laser-light segments from the side, and the respective bending angle of the laser-light segment being viewed relative to a reference plane can be calculated by triangulation from the sensed images of the laser-light segments. The measuring region of such a light-section sensor is obtained from the surface of intersection between the plane of the line laser and the sensing region determined by the imaging optics and the image sensor of the image-sensing unit 23. The measuring regions 20, 21 illustrated in rectangular form for simplicity in FIG. 1 may therefore also have shapes different from this.

Figure 2:
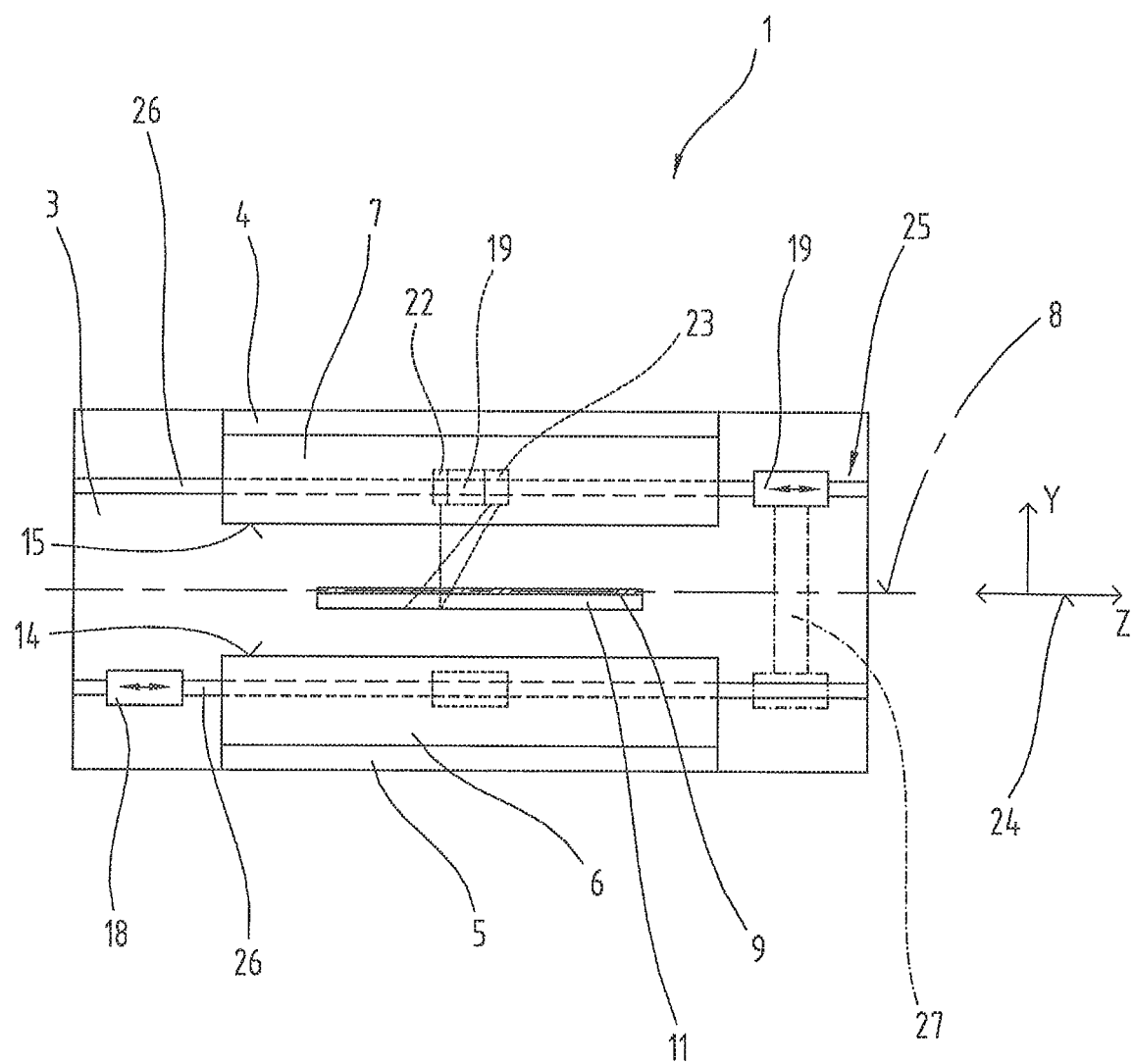
FIG. 2 shows a view of a bending beam in direction II in FIG. 1.

FIG. 2 shows a view in direction II according to FIG. 1 of a further possible embodiment of a bending beam 1. In this embodiment, the base 3 of the beam cross section 2 in Z-direction, i.e. the longitudinal direction 24 of the bending beam 1, has a greater length than the bending tools 6, 7, and the angle-measuring units 18 and 19 can be positionable in longitudinal direction 24 of the bending beam 1 by means of a guide arrangement 25. Thereby, in the case of long workpieces 9, in which bending-angle fluctuations may occur along the bending-edge length, measurements of the bending angle 13 may also be performed at several positions. In FIG. 2, the angle-measuring units 18 and 19 are mounted on guide rails 26 and, by means of a positioning drive, not illustrated, can be positioned at different points along the Z-direction of the bending beam 1 by the programmable control device of the angle measuring system 17.

In FIG. 2, a middle position of the second angle-measuring unit 19 during a bending-angle measurement of a downwardly bent workpiece portion 11 is illustrated with dashed lines, wherein the measuring plane of the line laser 22 and the sensing region of the image-sensing unit 23 disposed laterally relative thereto are likewise indicated by dashed lines.

Since the angle-measuring units 18, 19 in the interior 10 of the bending beam 1 represent an interference contour, which may prevent machining of certain workpiece geometries, it may be of advantage when the angle-measuring units 18, 19 can be positioned laterally beyond the axial ends of the bending tools 6, 7 by means of the guide arrangement 25, since thereby a greater free space for bending is provided in the interior 10 of the bending beam 1. The first angle-measuring unit 18 and the second angle-measuring unit 19 may then be positionable independently of one another, as indicated by solid lines in FIG. 2, although it is also possible for the angle-measuring units 18, 19 to be fastened on a common carriage 27, as is indicated by dashed lines in FIG. 2. In this case, a common positioning drive for the common carriage 27 may be sufficient for positioning of the two angle-measuring units 18, 19. Such a carriage 27 may be guided on a single guide rail 26, but advantageously on two guide rails 26, whereby a high mechanical stability of the carriage 27 and thus also of the angle-measuring units 18, 19 is achieved therewith.

Since the space requirement of the angle-measuring system 17 also limits the maximum dimensions of the workpieces that are suitable for a gauging of the bending angle, it is of advantage when, as illustrated in FIG. 1, the inside width 28 between the two angle-measuring units 18 and 19 corresponds approximately to the tool spacing 29, but at least to 75% of the tool spacing 29, and thereby workpiece portions 11 are also able to protrude between the angle-measuring units 18 and 19 prior to the bending process.

Figure 3:
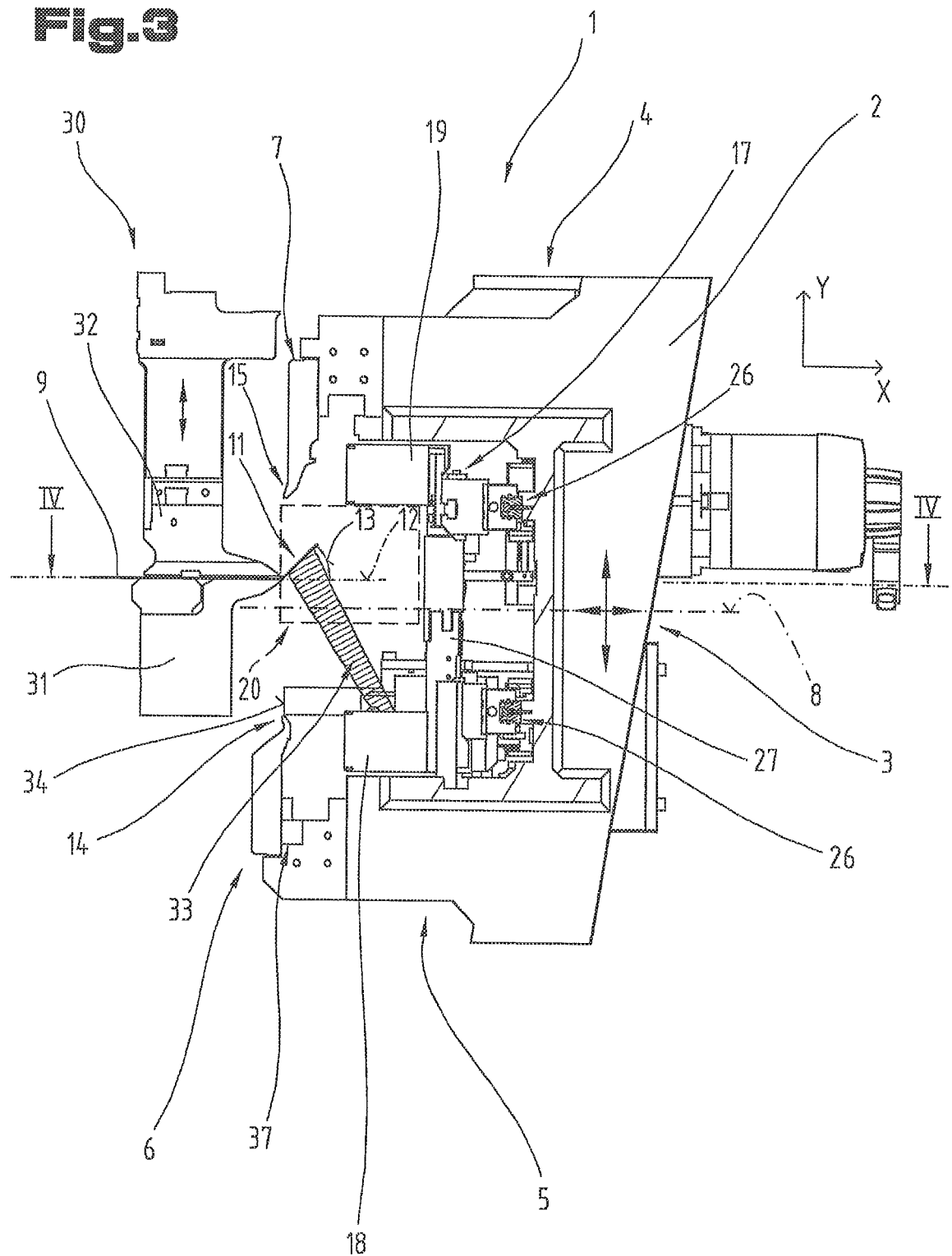
FIG. 3 shows a section through a further embodiment of a bending beam according to the invention.

FIG. 3 shows a section through a further embodiment of a bending beam 1 and the performance of a bending-angle measurement. The workpiece-holding jig 30, with which a workpiece 9 for the execution of a bending process is fixed in such a way that a workpiece portion 11 protruding relative to the workpiece-holding device 30 can be bent upward by means of the first bending tool 6 or downward by means of the second bending tool 7, is illustrated for simplicity to the left of the bending beam 1. For this purpose, the workpiece-holding device 30 of the swivel bending machine comprises a first clamping tool 31 and, cooperating therewith, a positionable second clamping tool 32, between which a workpiece 9 can be clamped. In general, the lower first clamping tool 31 is constructed to be fixed, and its upper clamping face forms a fixed working plane, which can be used as the reference face 12 for the measurement of the bending angle 13.

The workpiece portion 11 illustrated in FIG. 3 and bent upward in a preceding bending process is now gauged by the angle-measuring system 17 in the following way. The bending beam 1 is moved by means of its positioning drive 16 (see FIG. 1) into a position in which the workpiece portion 11 to be gauged lies within the first measuring region 20 of the first angle-measuring unit 18. Then the angle-measuring unit 18 is moved in longitudinal direction of the bending beam 1, i.e. in Z-axis direction, into the desired measuring position, which is defined by the plane of the line laser 22. The objects illuminated by the line laser 22 yield a series of laser-light segments, which are sensed by the image-sensing unit 23 spaced apart in Z-direction. By means of an image-evaluation method known from the prior art, the laser-light segment formed on the workpiece portion 11 to be gauged is now identified, and the actual angular orientation in space and thereby also the achieved bending angle 13 is back-calculated by means of triangulation from its angular orientation in the sensed image. The evaluation region 33 relevant for this bending-angle measurement is illustrated in shaded manner in FIG. 3.

The respectively determined bending angle 13 can now be used for the purpose of executing subsequent bending processes on the same workpiece 9 in such a way that the forming behavior of the workpiece 9, especially the springback, is considered and that more accurate bending angles 13 are achieved thereby. Furthermore, the measured bending angle can be used in the course of the two-stage bending method described in the foregoing for finish-bending of the same bending edge, or else the forming behavior recorded on a first workpiece 9 may be transferred to another identical workpiece 9, without this having to need its own bending-angle measurement.

The angle-measuring units 18 and 19 as already described on the basis of FIG. 2 are fastened on a common carriage 27, which is positionable in longitudinal direction 24 of bending beam 1 and is guided on two running rails 26.

Optionally, a stop element, which forms a stop face 34 oriented at right angles to the central plane 8, may be formed on this carriage 27. This stop face 34 may be brought to the height of the stop face of the first clamping element 31 by positioning of the bending beam 1 and thereby, during introduction of a workpiece 9, a defined starting position of the workpiece 9 for subsequent positioning movements can be established, which are executed, for example, by means of a programmable manipulator.

Figure 4:
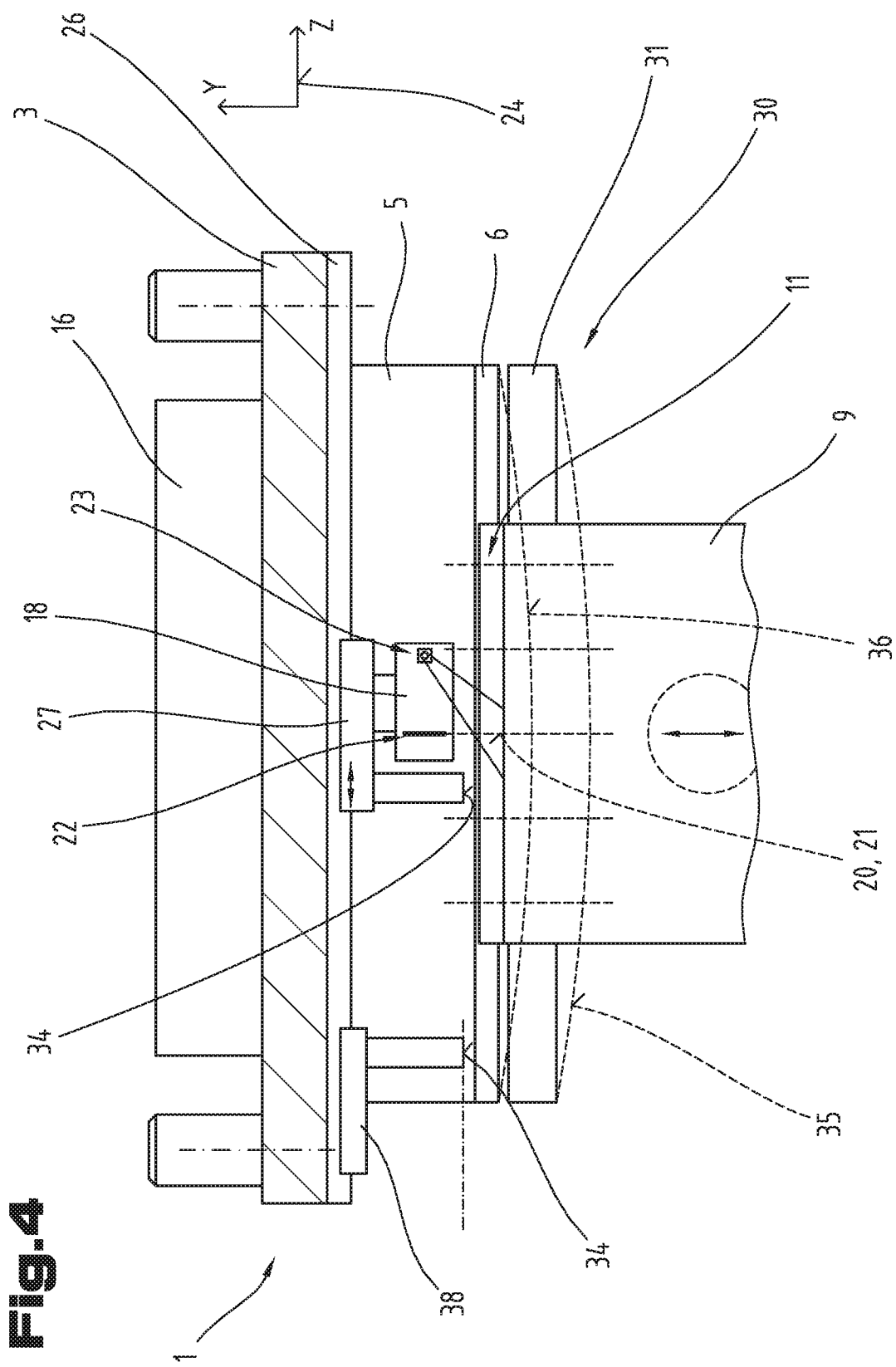
FIG. 4 shows a section through a bending beam along line IV-IV in FIG. 3.

FIG. 4 shows a simplified overhead view of a bending beam 1 in a section along a line IV-IV in FIG. 3.

In this case, the first angle-measuring unit 18 is situated approximately in a middle position relative to the longitudinal direction 24 of the bending beam 1, and a dashed line starting from the line laser 22 indicates the measuring region 20 or 21 in which a measurement of a bending angle 13 takes place. To the left and right thereof, further measuring positions on the workpiece 9 are indicated by dashed lines, whereby fluctuations of the bending angle 13 along a bending edge can be observed.

This may occur in particular by the fact that deviations from the straight ideal shape occur on the holding device 30 or else on the bending beam 1 due to the forming forces being applied. In FIG. 4, such a curvature 35 of the workpiece-holding jig 30 is indicated with a dashed line. Since different bending angles 13 are formed in the case of such a curvature of the workpiece-holding device 30 along the bending edge, it is of advantage when a cambering device on the bending beam 1 is able to impose a curvature 36 in the same sense on the respective bending die 6 or 7, as is likewise illustrated in exaggerated representation by a dashed line on the bending die 6. Such an optional cambering device 37 is illustrated in FIG. 3 on the lower first bending die 6. Such a cambering device 37 may produce, for example, an active outward deformation of the bending die 6 in the middle region or else alternatively or additionally increase the compliance at the ends of the bending die 6, whereby a convex shape of the bending die 6 can likewise be achieved. Such cambering devices 37 are based, for example, on the use of various wedge faces and in particular are known from the field of press brakes, and in this respect reference is made to embodiments of such cambering devices 37 known from the prior art. Alternatively or additionally, such a cambering device 37 may also be provided for the upper second bending die 7. In FIG. 4, such curvatures are illustrated in the X-Z plane but, alternatively or additionally, curvatures in the Y-Z plane may also be correctable.

FIG. 4 shows further that a second carriage 38, on which an additional stop face 34 for a workpiece 9 may be formed by means of a suitable stop element, may be optionally provided. Such an additional carriage 38 may further be constructed as the basis for later supplements with additional angle-measuring units.

Figure 5:
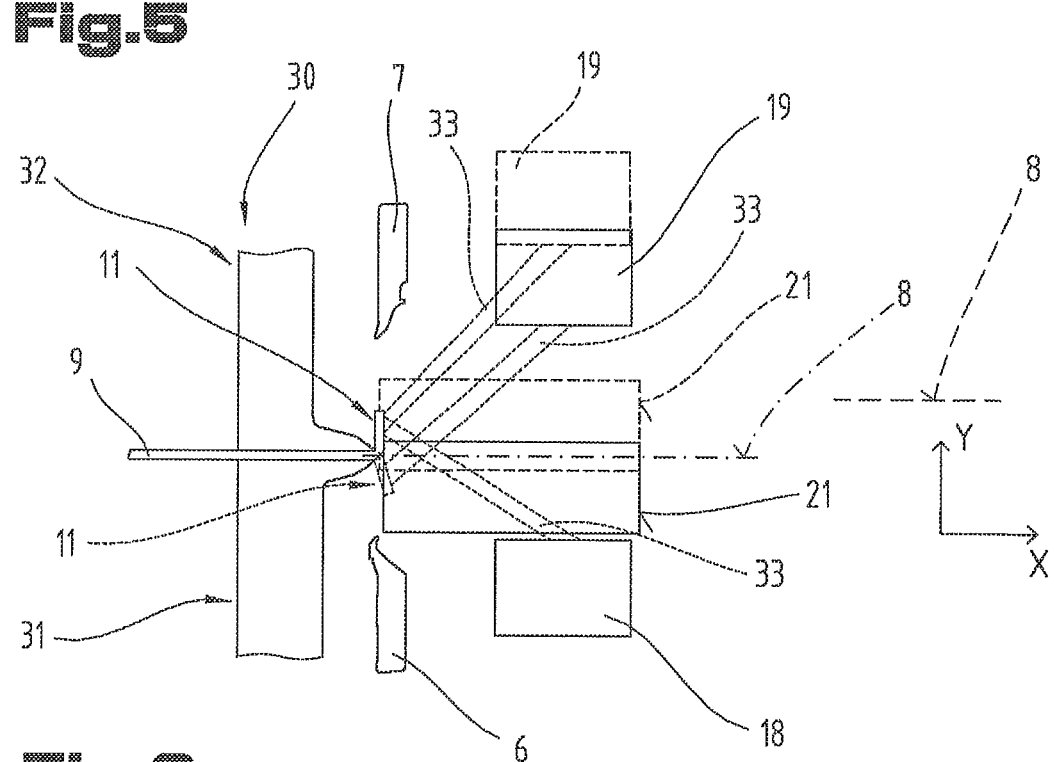
FIG. 5 shows a diagram of the application of a bending beam according to the invention and FIG. 6 shows further applications of a bending beam according to the invention.

FIG. 5 illustrates, in a further application example, the flexibility of the angle-measuring system 17 of a bending beam 1 according to the invention. An upwardly bend workpiece portion 11 is gauged in general with the first angle-measuring unit 18, which is oriented upward, and a downwardly bent workpiece portion 11, illustrated by a dashed line, is gauged with the upper second angle-measuring unit 19. It is also possible, however, by suitable positioning of the bending beam 1 upward in Y-direction, to displace the measuring region 21 of the second angle-measuring unit 19 upward, whereby the upwardly bent workpiece portion 11 can be brought into the raised measuring region 21 (illustrated with dashed lines). This selection option as to whether a bending-angle measurement takes place with the first angle-measuring unit 18 oriented from bottom to top or with the second angle-measuring unit 19 oriented from top to bottom, permits additional degrees of freedom in the possible gaugeable geometry of the workpieces 9.

The selection of the respective angle-measuring instrument 18, 19 to be used or of the suitable positioning of the bending beam 1 and/or of the workpiece 9 for the performance of bending-angle measurements may also be achieved advantageously by a programmable control device of the swivel bending machine.

Figure 6:
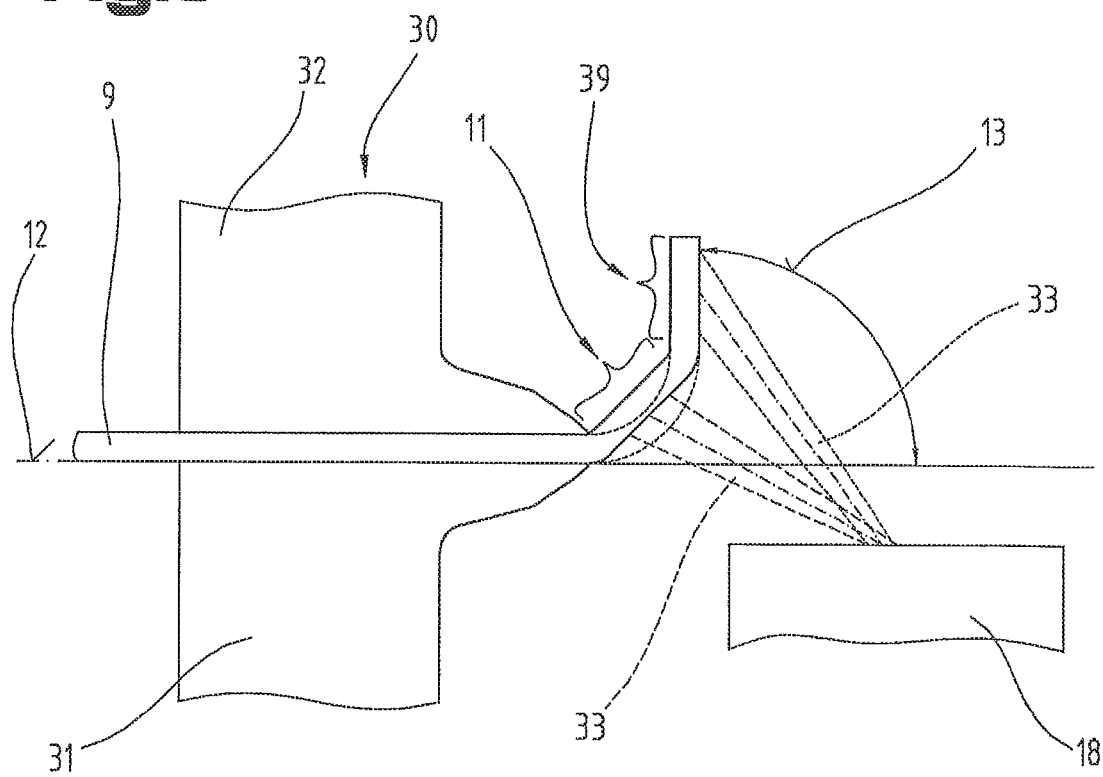

FIG. 6 schematically illustrates a further possible use of the angle-measuring system 17 of a bending beam according to the invention. In this case, an evaluation area 33, which is directed toward a workpiece portion 11 obtained from an immediately preceding bending process, and which is situated within the measuring region 20 (see FIG. 1 and FIG. 3) and is selected for image evaluation of the angle-measuring system 17, is illustrated by dashed lines. It is also possible, however, to align the evaluation region 33 toward a workpiece portion 39 that was produced on the workpiece 9 by two or more preceding bending processes. Such an evaluation region 33 is indicated with dotted lines in FIG. 6, and in this case the bending angle 13 of the perpendicularly upward protruding bending limb is measured by the first angle-measuring unit 18. Thus, by suitable selection of the respective evaluation region 33, the bending accuracy can be optimized, especially in that workpiece portion which possesses the highest angle-accuracy requirements. For example, if the straight end portion of a bending limb that is connected with a bending radius to the rest of a workpiece 9 is supposed to have an exact bending angle 13, the stepwise pre-bending and subsequent finish-bending described in the foregoing may be applied especially to this workpiece portion, by placing the evaluation region 33 on this workpiece portion 39.

In the course of the image evaluation, it is also possible to sense a sequence of several sensed laser-light segments as a whole and to compare the actual profile of a workpiece calculated therefrom with a nominal profile, e.g. for control of a radius bend composed of a large number of individual bends.

For accurate performance of bending-angle measurements, it may be further advantageous to cancel the clamping of the workpiece 9 at least partly or completely prior to performance of the angle measurement, whereby not only the springback due to the cancellation of the forming force takes effect due to the removal of the bending tool 6, 7, but also angle changes, that are present due to the springback in the workpiece holding jig and that could falsify the measured bending angle 13, can become free.

The method steps described hereinabove for the bending-angle measurement as well as the other workflow steps during the bending processes are advantageously also executed or initiated automatically by a programmable control device of a swivel bending machine.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Bending beam
2 Beam cross section
3 Base
4 Limb
5 Limb
6 First bending tool
7 Second bending tool
8 Central plane
9 Workpiece
10 Interior
11 Workpiece portion
12 Reference plane
13 Bending angle
14 First working edge
15 Second working edge
16 Positioning drive
17 Angle-measuring system
18 First angle-measuring unit
19 Second angle-measuring unit
20 First measuring region
21 Second measuring region 22 Line laser
23 Image-sensing unit
24 Longitudinal direction
25 Guide arrangement
26 Guide rail
27 Carriage
28 Inside width
29 Tool spacing
30 Workpiece holding device
31 First clamping tool
32 Second clamping tool
33 Evaluation region
34 Stop face
35 Curvature
36 Curvature
37 Cambering device
38 Carriage
39 Workpiece portion

The invention claimed is:

1. A bending beam for a swivel bending machine, comprising:
an elongated bending beam portion having a C-shaped beam cross section enclosing an interior;
an angle-measuring system disposed within the interior for contactless measurement of a bending angle; and
first and second bending dies mounted on the bending beam and disposed oppositely relative to a horizontal central plane and turned toward one another, the first and second bending dies extending in a longitudinal direction of the bending beam portion and configured to receive between each other a workpiece portion of a workpiece to be bent;
wherein the angle-measuring system is configured to measure the bending angle of the workpiece portion being bent by one of the first and second bending dies relative to a horizontal reference plane;
wherein the angle-measuring system comprises a first angle-measuring unit and a second angle-measuring unit, the first angle-measuring unit being disposed underneath the central plane and having a first measuring region situated for the most part above the central plane, and the second angle-measuring unit being disposed above the central plane and having a second measuring region situated for the most part underneath the central plane;
wherein the first measuring region and the second measuring region overlap in a region of the central plane between the first and second bending dies;
wherein the angle-measuring units each comprise a light-section sensor with a line laser and an image-sensing unit spaced apart from the line laser in the longitudinal direction of the bending beam portion;
wherein workpiece portions bent upwardly with respect to the central plane are measured mainly by the first angle-measuring unit and while an adjacent portion of the bent workpiece remains in or parallel to the horizontal reference plane and workpiece portions bent downwardly with respect to the central plane are measured mainly by the second angle-measuring unit and while an adjacent portion of the bent workpiece remains in or parallel to the horizontal reference plane;
wherein the line lasers of the first angle-measuring unit and of the second angle-measuring unit are arranged to transmit light beams which are oriented at an inclined angle with respect to the central plane; and
wherein the angle-measuring units are positionable by a guide arrangement comprising at least one guide rail and a carriage in the longitudinal direction and wherein the angle-measuring units are positionable beyond an axial end of the bending dies with respect to the longitudinal direction of the bending beam portion.

2. The bending beam according to claim 1, wherein both the first measuring region and the second measuring region include the central plane between the bending dies.

3. The bending beam according to claim 1, wherein an inside width between the angle-measuring units corresponds to at least 75% of a die spacing that exists between the bending dies.

4. The bending beam according to claim 1, wherein the angle-measuring units are commonly fastened on the carriage.

5. The bending beam according to claim 4, wherein the elongated bending beam portion comprises a base spaced from the first and second bending dies, the at least one guide rail comprises two spaced-apart guide rails on the base and wherein the carriage is guided on the two spaced-apart guide rails on the base.

6. The bending beam according to claim 4, wherein the first bending die comprises a lower bending die disposed below the central plane and wherein a stop face at right angles to the central plane is formed on the carriage at the height of the lower bending die.

7. The bending beam according to claim 1, wherein a cambering device is formed on the bending beam, the cambering device comprising at least one wedge for influencing the curvature along the longitudinal direction of the first bending die or the second bending die.

8. A swivel bending machine, comprising a machine frame, a workpiece-holding unit with a first clamping tool joined to the machine frame, and a positionable second clamping tool interacting therewith for fixation of a workpiece in a working plane so that a workpiece portion to be bent protrudes relative to the workpiece-holding unit, and a bending beam mounted positionably on the machine frame and joined to a positioning drive for bending the workpiece portion, wherein the bending beam is formed according to claim 1.

9. A method for measuring a bending angle on a workpiece, the method comprising:
providing a swivel bending machine with an elongated bending beam having a C-shaped beam cross section enclosing an interior, an angle measuring system disposed within the interior for contactless measurement of the bending angle, and first and second bending dies mounted on the bending beam portion and disposed oppositely relative to a horizontal central plane and turned toward one another, the first and second dies extending in a longitudinal direction of the bending beam and configured to receive between each other a workpiece portion of a workpiece to be bent;
bending the workpiece portion of the workpiece by one of the first and second bending dies;
measuring the bending angle of the workpiece portion being bent by one of the first and second bending dies relative to a horizontal reference plane using the angle-measuring system;
wherein the angle-measuring system comprises a first angle-measuring unit and a second angle-measuring unit, the first angle-measuring unit being disposed underneath the central plane and having a first measuring region situated for the most part above the central plane, and the second angle-measuring unit being disposed above the central plane and having a second measuring region situated for the most part underneath the central plane;

wherein the first measuring region and the second measuring region overlap in a region of the central plane between the first and second bending dies;

wherein the angle-measuring units each comprise a light-section sensor with a line laser and an image-sensing unit spaced apart from the line laser in the longitudinal direction of the bending beam portion;

wherein workpiece portions bent upwardly with respect to the central plane are measured mainly by the first angle-measuring unit and while an adjacent portion of the bent workpiece remains in or parallel to the horizontal reference plane and workpiece portions bent downwardly with respect to the central plane are measured mainly by the second angle-measuring unit and while an adjacent portion of the bent workpiece remains in or parallel to the horizontal reference plane; and wherein the line lasers of the first angle-measuring unit and of the second angle-measuring unit are arranged to transmit light beams which are oriented at an inclined angle with respect to the central plane; and wherein the angle-measuring units are positionable by a guide arrangement comprising at least one guide rail and a carriage in the longitudinal direction and wherein the angle-measuring units are positionable beyond an axial end of the bending dies with respect to the longitudinal direction of the bending beam portion.

10. The method according to claim 9, further comprising the steps of:
clamping the workpiece in a workpiece-holding device
removing at least one of the first bending die and the second bending die from the workpiece
subsequently deactivating or reducing the workpiece clamping of the workpiece-holding device;
wherein the step of measuring the bending angle of the workpiece portion being bent is performed after the step of removing at least one of the first bending die and the second bending die from the workpiece and after the step of subsequently deactivating or reducing the workpiece clamping of the workpiece-holding device.

11. The method according to claim 9, further comprising the step of
performing two or more bending processes on the workpiece before the step of measuring the bending angle of the workpiece portion being bent.

12. The method according to claim 9, wherein the step of measuring the bending angle of the workpiece portion being bent comprises measuring the bending angle on the workpiece portion after a bending process
at a plurality of positions spaced apart from one another in the longitudinal direction of the bending beam.

13. The method according to claim 12 wherein, based on the measurements after a preceding bending process, a subsequent bending process is adapted.

* * * * *